US008038164B2

(12) United States Patent  (10) Patent No.: US 8,038,164 B2
Stahl et al.  (45) Date of Patent: Oct. 18, 2011

(54) VEHICLE WITH STEP ASSEMBLY

(75) Inventors: Glenn E. Stahl, White Lake, MI (US); Kevin G. Kolpasky, Oakland Township, MI (US); Joseph M. Polewarczyk, Rochester Hills, MI (US); Raymond A. Beaufait, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 216 days.

(21) Appl. No.: 12/475,491

(22) Filed: May 30, 2009

(65) Prior Publication Data

US 2010/0301580 A1 Dec. 2, 2010

(51) Int. Cl.
*B60R 3/02* (2006.01)
(52) U.S. Cl. ...................................................... 280/166
(58) Field of Classification Search .................. 280/762, 280/763.1, 764.1, 765.1, 766.1, 163, 164.1, 280/164.2, 165, 166, 169; 182/91, 127; 296/198
See application file for complete search history.

(56) References Cited

U.S. PATENT DOCUMENTS

| 2,378,678 | A | * | 6/1945 | Anderson | 182/150 |
|---|---|---|---|---|---|
| 2,575,503 | A | * | 11/1951 | Warren | 182/150 |
| 2,679,436 | A | * | 5/1954 | Viebrock et al. | 182/150 |
| 3,078,952 | A | * | 2/1963 | Kelling | 182/150 |
| 3,590,950 | A | * | 7/1971 | Wilson | 182/150 |
| 4,462,486 | A | * | 7/1984 | Dignan | 182/91 |
| 4,782,916 | A | * | 11/1988 | Hays | 182/150 |
| 4,800,987 | A | * | 1/1989 | Liles | 182/92 |
| 4,913,458 | A | * | 4/1990 | Hamilton | 280/6.153 |
| 4,930,797 | A | * | 6/1990 | Parrill | 280/166 |
| 4,947,961 | A | * | 8/1990 | Dudley | 182/92 |
| 5,133,429 | A | * | 7/1992 | Densley | 182/150 |
| 5,456,479 | A | * | 10/1995 | Conger | 280/165 |
| 6,044,928 | A | * | 4/2000 | Law et al. | 182/150 |
| 6,082,752 | A | * | 7/2000 | Sumrall | 280/163 |
| D448,335 | S | * | 9/2001 | Ehnes | D12/203 |
| 6,422,342 | B1 | * | 7/2002 | Armstrong et al. | 182/127 |
| 6,457,558 | B1 | * | 10/2002 | Ehnes | 182/150 |
| 6,550,578 | B1 | * | 4/2003 | Law et al. | 182/150 |
| 6,659,224 | B2 | * | 12/2003 | Medsker | 182/91 |
| 6,676,223 | B2 | * | 1/2004 | Kolpasky | 301/5.1 |
| 6,767,023 | B1 | * | 7/2004 | Nicholson | 280/165 |
| 6,840,526 | B2 | * | 1/2005 | Anderson et al. | 280/166 |
| 6,905,158 | B1 | * | 6/2005 | Bastian | 296/62 |
| 6,964,444 | B2 | * | 11/2005 | Chumley et al. | 296/26.08 |
| 7,059,449 | B2 | * | 6/2006 | Zhang | 182/150 |
| 7,086,656 | B2 | * | 8/2006 | Kolpasky et al. | 280/164.1 |
| 7,168,523 | B1 | * | 1/2007 | Tafoya et al. | 182/150 |
| 7,270,381 | B2 | | 9/2007 | Kolpasky et al. | |
| D573,929 | S | * | 7/2008 | Black | D12/203 |
| 7,455,307 | B2 | * | 11/2008 | Seely et al. | 280/163 |
| 2002/0060451 | A1 | * | 5/2002 | Lambertus | 280/770 |
| 2002/0180174 | A1 | * | 12/2002 | Johnston | 280/164.1 |
| 2003/0071433 | A1 | * | 4/2003 | Rammer, Jr. | 280/163 |

(Continued)

*Primary Examiner* — Paul N Dickson
*Assistant Examiner* — Nicole Verley
(74) *Attorney, Agent, or Firm* — Quinn Law Group, PLLC

(57) ABSTRACT

A vehicle includes a vehicle body. The body defines a wheel well and has a body panel that at least partially defines an opening of the wheel well. A wheel is operatively connected to the vehicle body, is selectively rotatable about an axis, and is at least partially disposed within the wheel well. A member has a first end and a second end. The first end is rotatably mounted with respect to the body panel forward of the axis. The second end is rotatably mounted with respect to the body panel rearward of the axis.

12 Claims, 1 Drawing Sheet

U.S. PATENT DOCUMENTS

| | | | |
|---|---|---|---|
| 2003/0094781 A1* | 5/2003 | Jaramillo et al. | 280/166 |
| 2004/0256833 A1* | 12/2004 | Cervenka | 280/163 |
| 2006/0226624 A1* | 10/2006 | Chen | 280/165 |
| 2008/0084044 A1* | 4/2008 | Dietelbach | 280/165 |
| 2008/0084045 A1* | 4/2008 | Filias et al. | 280/166 |
| 2009/0322052 A1* | 12/2009 | Ruehl | 280/166 |

* cited by examiner

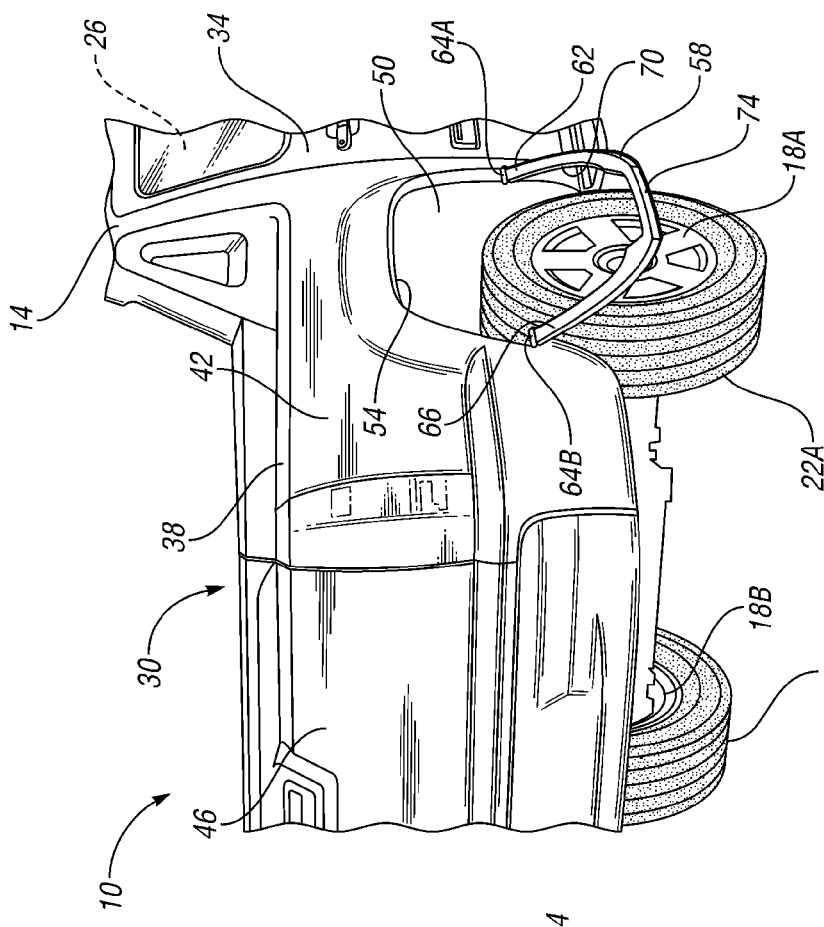
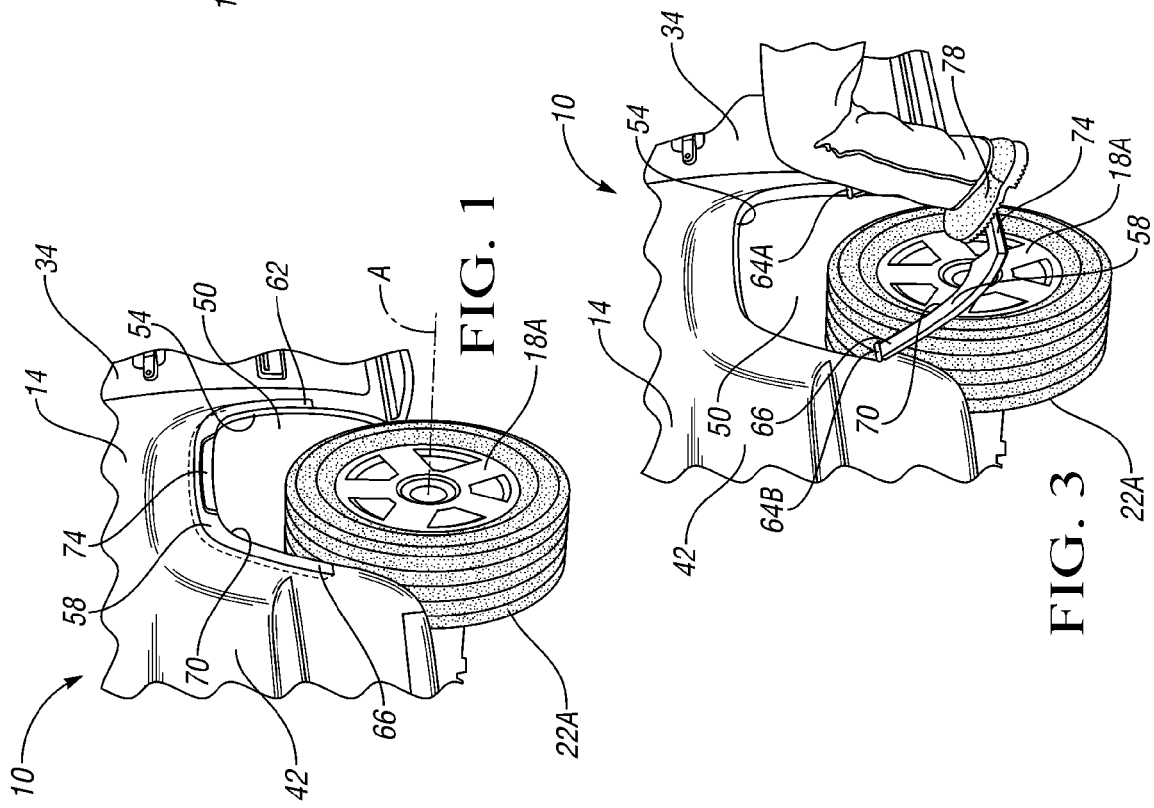

VEHICLE WITH STEP ASSEMBLY

TECHNICAL FIELD

This invention relates to vehicles having steps for elevating a vehicle user.

BACKGROUND OF THE INVENTION

Situations frequently arise when a vehicle owner needs to access portions of a motor vehicle over the fender or quarter panel. For example, there may be a need to inspect or service the engine, a need to reach into the cargo bed, or a need to reach up to overhead cargo racks. The height of some automotive vehicles, such as vans, sport utility vehicles, and pick-up trucks, may result in inconvenience and/or difficulty for a person who is standing on the ground to access parts of the motor vehicle over the fenders or quarter panels.

Some pick-ups have a step formed in the fenders on one side of the wheel well; some vehicles have running boards, and some vehicles have a step at the bumper. However, these provisions do not assist a person in accessing areas over the fenders or quarter panels directly above the wheel wells. Because of this, a person who needs to access parts of the motor vehicle above the wheel wells may need to utilize some object to stand upon, if one can be found.

SUMMARY OF THE INVENTION

A vehicle includes a vehicle body. The body defines a wheel well and has a body panel that at least partially defines an opening of the wheel well. A wheel is operatively connected to the vehicle body, is selectively rotatable about an axis, and is at least partially disposed within the wheel well. A member has a first end and a second end. The first end is rotatably mounted with respect to the body panel forward of the axis. The second end is rotatably mounted with respect to the body panel rearward of the axis.

The member is thus rotatable with respect to the body panel. In an exemplary embodiment, the member is rotatable between a stowed position, in which the member frames the opening of the wheel well and abuts the body panel, and a deployed position in which the member is positioned to support a user above the ground to facilitate access to the vehicle above the wheel well.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic, perspective, rear view of a vehicle having a body panel and a step in a stowed position;

FIG. 2 is a schematic, perspective, rear view of the vehicle of FIG. 1 with the step in a deployed position; and FIG. 3 is a schematic, perspective, rear view of the vehicle of FIGS. 1 and 2 with the step in the deployed position and supporting the foot of a vehicle user.

DESCRIPTION OF THE PREFERRED EMBODIMENTS

Referring to FIGS. 1 and 2, a vehicle 10 includes a vehicle body 14. A plurality of wheels 18A, 18B are rotatably mounted with respect to the vehicle body 14 and support the body 14 above the ground, as understood by those skilled in the art. The vehicle 10 also includes a plurality of tires 22A, 22B; each of the tires 22A, 22B is mounted to the periphery of a respective one of the wheels 18A, 18B. Those skilled in the art will recognize that the vehicle 10 includes four wheels and tires; only the two rear wheels and tires are shown in the Figures. Wheels 18A, 18B and tires 22A, 22B are selectively rotatable about an axis A.

In the embodiment depicted, the vehicle body 14 has a pickup truck configuration, although other body styles and configurations may be employed within the scope of the claimed invention, such as sport-utility vehicle (SUV), van, minivan, sedan, station wagon, etc. The body 14 defines a passenger compartment 26 and a cargo compartment 30. The passenger compartment 26 is accessible by a passenger door 34, as understood by those skilled in the art. The cargo compartment 30 in the embodiment depicted is defined by a pickup truck cargo bed 38, also sometimes referred to as a "cargo box," which is disposed rearward of the passenger compartment 26.

The vehicle body 14 includes a body panel 42 which, in the embodiment depicted, is a rear quarter panel that defines one of the side walls of the cargo bed 38. A tail gate 46 is selectively rotatable between open and closed positions to selectively provide access to the cargo bed 38 at the rear of the vehicle body 14.

The vehicle body 14 defines a plurality of wheel wells, including the wheel well shown at 50, for containing a respective wheel and tire. Wheel 18A and tire 22A are partially disposed within wheel well 50. Body panel 42 defines an opening 54 of wheel well 50. The opening 54 is generally C-shaped.

A C-shaped step member 58 has a first end 62 that is rotatably mounted with respect to the body panel 42 forward of the axis A, such as via a hinge 64A. The step member 58 also has a second end 66 that is rotatably mounted with respect to the body panel 42 rearward of the axis A, such as via a hinge 64B. The step member 58 extends forward and rearward of the wheel 18A and the tire 22A, and interconnects two sides of the opening 54. The step member 58 is selectively rotatable about the hinges 64A, 64B, and with respect to the body panel 42, between a stowed position, as shown in FIG. 1, and a deployed position, as shown in FIGS. 2 and 3.

Referring specifically to FIG. 1, when the step member 58 is in the stowed position, the step member 58 abuts the body panel 42 adjacent the opening 54 of the wheel well 50. Surface 70 of the step member 58 is generally C-shaped, and thus the step member 58 frames the opening 54 when the step member 58 is in the stowed position. A portion 74 of the step member 58 is higher than the wheel 18A and the tire 22A when the step member 58 is in the stowed position.

Referring specifically to FIG. 2, when the step member 58 is in the deployed position, the portion 74 of the step member 58 is lower and further outboard than when the member 58 is in the stowed position. More specifically, in the embodiment depicted, the portion 74 is directly outboard of the wheel 18A, and is approximately at the same height as the center of the wheel 18A and the axis A. Referring to FIG. 3, when the step member 58 is in the deployed position, portion 74 is positioned and oriented for use as a step to support a vehicle user. That is, portion 74 is positioned to receive the foot 78 of the vehicle user to elevate the vehicle user and thereby faciliate access to the central portion of the cargo bed (shown at 38 in FIG. 2). If the body 14 has another body style, such as a van or a sport utility vehicle, then the step member 58 facilitates access to the roof of the vehicle.

In the embodiment depicted, the body panel 42 is a rear quarter panel. However, and within the scope of the claimed invention, the body panel 42 may be a front fender; in such an embodiment, the step member would facilitate access to the engine compartment, windshield, etc.

It may be desirable for the member 58 to be spring biased in the stowed position. It may also be desirable for latches (not shown) to releasably retain the member 58 in the stowed and/or deployed positions.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a vehicle body defining a wheel well and including a body panel that at least partially defines an opening of the wheel well;
a wheel being operatively connected to the vehicle body, selectively rotatable about an axis, and at least partially disposed within the wheel well;
a first hinge disposed farther forward, relative to the vehicle body, than the wheel;
a second hinge disposed farther rearward, relative to the vehicle body, than the wheel; and
a member having a first end that is rotatably mounted with respect to the body panel via the first hinge, and a second end that is rotatably mounted with respect to the body panel via the second hinge.

2. The vehicle of claim 1, wherein the member is selectively rotatable with respect to the body panel between a stowed position and a deployed position; and
wherein a portion of the member is lower and further outboard when the member is in the deployed position than when the member is in the stowed position.

3. The vehicle of claim 2, wherein the member is generally C-shaped.

4. The vehicle of claim 2, wherein a portion of the opening is characterized by a shape; and wherein the member is characterized by a surface having substantially the same shape as the portion of the opening.

5. The vehicle of claim 2, wherein the portion of the member is directly outboard of the opening when the member is in the deployed position; and
wherein the portion of the member is higher than the opening when the member is in the stowed position.

6. The vehicle of claim 1, wherein the body panel is a rear quarter panel.

7. The vehicle of claim 1, further comprising a tire mounted to the wheel and at least partially disposed within the wheel well;
wherein the first hinge is farther forward, relative to the body, than the tire; and
wherein the second hinge is farther rearward, relative to the body, than the tire.

8. A vehicle comprising:
a vehicle body defining a wheel well and a cargo bed, and including a body panel that at least partially defines an opening of the wheel well and that forms a sidewall of the cargo bed;
a wheel being operatively connected to the vehicle body, selectively rotatable about an axis, and at least partially disposed within the wheel well;
a first hinge disposed farther forward, relative to the vehicle body, than the wheel;
a second hinge disposed farther rearward, relative to the vehicle body, than the wheel; and
a member having a first end that is rotatably mounted with respect to the body panel via the first hinge, and a second end that is rotatably mounted with respect to the body panel via the second hinge.

9. The vehicle of claim 8, wherein the member is selectively rotatable with respect to the body panel between a stowed position and a deployed position; and
wherein a portion of the member is lower and further outboard when the member is in the deployed position than when the member is in the stowed position.

10. The vehicle of claim 9, wherein the member is generally C-shaped.

11. The vehicle of claim 9, wherein a portion of the opening is characterized by a shape; and wherein the member is characterized by a surface having substantially the same shape as the portion of the opening.

12. The vehicle of claim 9, wherein the portion of the member is directly outboard of the opening when the member is in the deployed position; and
wherein the portion of the member is higher than the opening when the member is in the stowed position.

* * * * *